United States Patent Office 2,833,663
Patented May 6, 1958

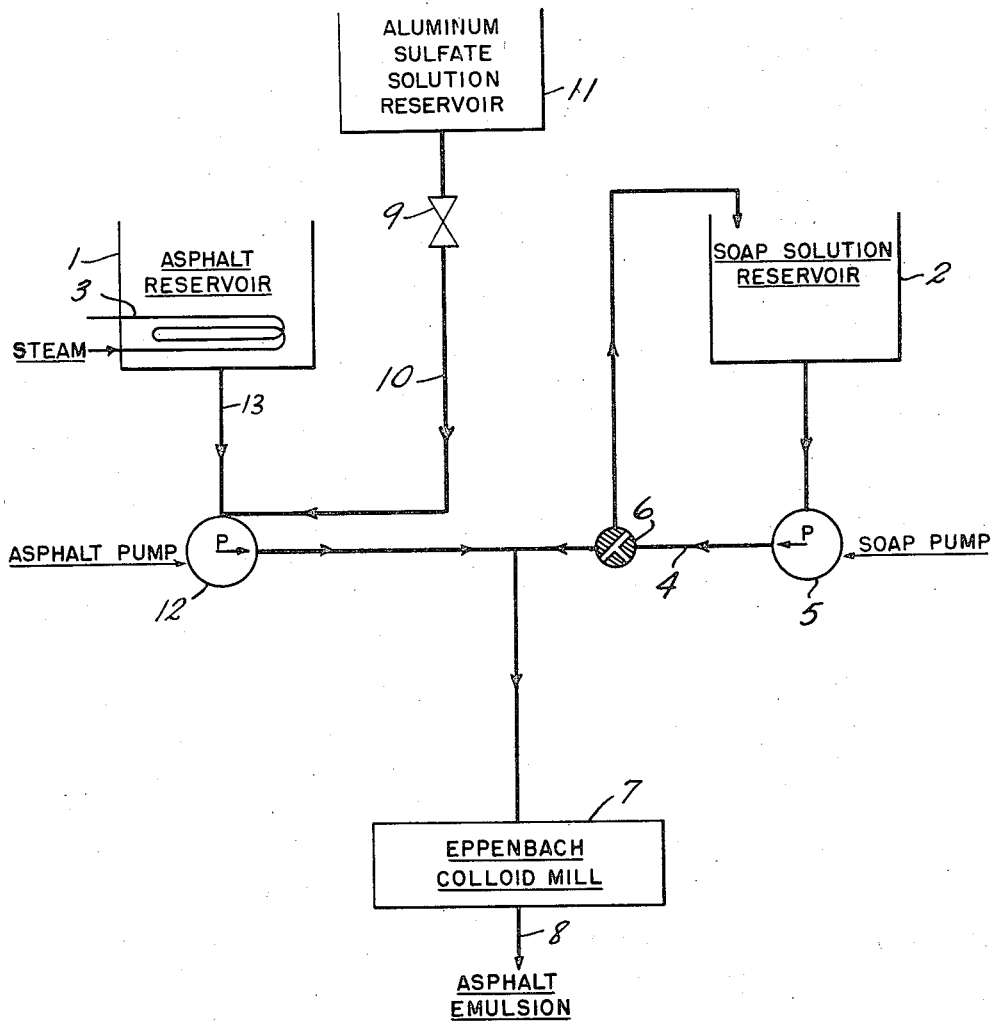

2,833,663

METHOD OF MAKING ASPHALT EMULSIONS

Robert F. Jenkins, Cleveland, and Elwood D. Wells, Lakewood, Ohio, assignors to The Standard Oil Company, Cleveland, Ohio, a corporation of Ohio Application August 17, 1953, Serial No. 374,628

3 Claims. (Cl. 106—277)

This invention relates to a process for the manufacture of an asphalt emulsion containing aluminum sulfate in the asphalt phase of the emulsion.

In a copending application Serial No. 374,608, filed August 17, 1953, now Patent No. 2,789,917, in which one of us is a joint inventor, an asphalt emulsion is described containing aluminum sulfate in the asphalt phase of the emulsion. Our invention relates more particularly to a process of making asphalt emulsions of this type.

In said copending application, it is pointed out that ordinary asphalt from petroleum sources, generally used in paving and termed "asphalt cement," must be heated to a temperature of about 250 to 350° F. in order to be free flowing for mixture with aggregate. Generally the aggregate must also be heated. In order to avoid the requirements for heating, it has been proposed to flux or dissolve the asphalt in a hydrocarbon solvent in order that the asphalt may be free flowing at room or ambient temperatures. The amount of the solvent determines the viscosity of the asphalt. These compositions are known as "cut-back" asphalts. This form of asphalt finds certain uses but is more expensive because of the solvent requirements. The evaporation of the solvent after use also presents fire hazards and may be time consuming.

A third general type of asphalt product is obtained by emulsifying asphalt in water. Asphalt "emulsions" have been used more extensively abroad than in this country. The asphalt is more commonly emulsified as the inner phase of the emulsion which is of the so-called oil-in-water type. The particles of asphalt in the emulsion range from 1 to 20 microns in size and the asphalt emulsion is free flowing at ordinary temperatures. The water and emulsifying agent used in making emulsion is, of course, much cheaper than the hydrocarbon solvent required for making a cut-back asphalt. The viscosities of the asphalt emulsions and the cut-back asphalts may be made comparable. Asphalt emulsions are generally made in three types: The RS or rapid setting type, the MS or medium setting type, and the SS or slow setting type. The first two are the most common and the RS type is subdivided into RS-1 and RS-2 types differing in viscosity.

In the process of making asphalt emulsions, the asphalt is heated to a liquid state, and the water containing the dispersing agent, generally soap, is emulsified with the heated asphalt, such as in a colloid mill. The emulsion varies in color from brown to black, the lighter colors generally indicating a greater subdivision of the asphalt particles.

When the asphalt emulsion is applied to aggregate or soil, the water either evaporates or is absorbed and the emulsion breaks. The asphalt residue is intended to adhere to the aggregate or soil.

In said copending application, it is also pointed out that asphalt emulsions must meet five important criteria, i. e., stability, demulsibility, asphalt content, viscosity and adhesion.

The emulsion must not separate before use and this property is referred to as "stability." This is important since the emulsion is usually prepared ahead of time and shipped in drums, tank or railroad cars and must remain unbroken in the emulsion form until used. If the emulsion breaks in the container, not only would the product be useless, but it would be difficult to remove the asphalt from the container. Practically speaking, the emulsion must remain stable during any storage time at the refinery, during shipping, and during any storage time after receipt until used. This period may vary widely from a week to many months depending on individual requirements. There are many instances where an asphalt emulsion is made, shipped and used in a few days. Federal specifications SS-A-674a require no separation of asphalt at the time of use provided the material is not held more than thirty days after delivery. There is no acceptable rating for asphalt emulsion stability.

The demulsibility indicates the rate at which the emulsion breaks into its components after it is applied. This is an important use property and to some extent is opposed to stability. It is possible to achieve adequate stability by increasing the emulsifier content, but demulsibility is adversely affected. The specifications for demulsibility are definite, and it is essential to meet them while at the same time achieving as much stability as possible. Generally ionic and polar materials increase demulsibility and give poor stability, as is seen by the fact that calcium chloride is used in the following test.

The demulsibility test is described as A. S. T. M. Test No. D-244-42 and is carried out by adding calcium chloride solution to the emulsion and measuring the amount of asphalt that is recovered from the emulsion within certain times. Ohio Specification M-5.5 requires at least 60% of the asphalt to be demulsified within the time specified in the A. S. T. M. test in the RS type, and not more than 30% in the MS type. Thus the emulsion must be one which is unstable under the conditions of use but must be stable until use.

The asphalt content is generally specified as 50% or more. Ohio Specification M-5.5 requires an asphalt content of at least 55% for the rapid setting types and at least 60% for the medium setting type. This requirement is important since it is the asphalt content of the emulsion that is of value and asphalts of high water content are less desirable because the water is of no value.

Viscosity requirements generally are such as to permit mixing of the emulsion with the aggregate. The viscosity is related somewhat to asphalt content. If the water content of the emulsion is plotted against viscosity, there is a sharp decrease in viscosity of the emulsion when the water content reaches 40 to 50%, and as the amount of water increases beyond this, the viscosity of the emulsion rapidly approaches the viscosity of water. Asphalt contents above about 50 to 60% have higher viscosities. Thus an emulsion with maximum asphalt content, which has a low enough viscosity for mixing, is ideal. The viscosity is measured in Furol seconds at a stated temperature. The viscosity measurement test is described as A. S. T. M. D-244-42. Ohio Specification M-5.5 specifies a viscosity of 20 to 100 for the RS-1 type at 25° C., 75 to 400 for the RS-2 type at 50° C., and 100 to 1,000 for the MS type at 50° C.

The last requirement, namely adhesion, is particularly important and is more significant in the case of emulsions than in the case of asphalt cements. Since asphalt cements are generally applied hot to dry aggregate, it is not as difficult to secure initial adhesion when the asphalt is mixed with aggregate. In the case of asphalt emulsions, however, the water is in the outer phase and tends to wet the aggregate before the asphalt touches it. In fact, one of the advantages attributed to asphalt emulsion is the ability to use a wet aggregate during construction, thereby eliminating the expense of drying and preheating the aggregate.

Asphalt emulsions are notoriously poor in adhesion properties. When this can be improved, such as with a larger amount of emulsifier or wetting agent, demulsibility is adversely affected. There is no standardized A. S. T. M. or Federal testing procedure for this property of emulsions. Various adhesion tests have been proposed and one test which has been devised, and which is the one used by the applicants, is Ohio Specification M–205.5. The testing procedure is as follows:

100 grams of dry standard silica aggregate graded to pass a ¼ inch sieve and to be retained on a No. 10 sieve shall be heated to 300° F. in a metal container on a hotplate, then 8 grams of the emulsion added (the emulsion need not be heated) and mixed until the aggregate is completely coated. Approximately 50 grams of the mixture shall be spread thinly on a metal can lid or a watch glass and placed in a constant temperature oven at 200° F. for 24 hours. At the end of this curing period, the 50-gram sample shall be thoroughly remixed if any drainage has occurred and dropped into 400 cc. of boiling distilled water in a 600 cc. beaker and stirred for 3 minutes at the rate of approximately 60 times per minute, continuing the boiling of the water during the 3-minute period. The beaker shall then be removed from the source of the heat and after ebullition ceases, cold water shall be run into the beaker through a ¼ inch tubing submerged about one inch below the surface of the water. The addition of the cold water shall be continued until the film of asphalt on the surface of the water in the beaker has flown over the side. After this is accomplished, the sample shall be removed from the beaker, care being taken to prevent re-coating of the aggregate with asphalt deposited on the beaker, and placed on absorbent paper. After drying, the sample shall be examined for uncoated areas and an estimate made of the percent of aggregate area remaining coated with asphalt.

Most commercial asphalt emulsions have a rating of 0 to 15% when tested by the above procedure. An additive that raises the adhesion of the asphalt emulsion to 50% under this test is considered to impart a marked improvement, and an adhesion of 75% or above is excellent.

A résumé of the requirements is as follows:

| Requirement | RS-1 | RS-2 | MS |
|---|---|---|---|
| Stability | Satisfactory. | Satisfactory. | Satisfactory. |
| Demulsibility: | | | |
| (35 cc. N/50 CaCl₂) percent | 60+ | 60+ | |
| (50 cc. N/10 CaCl₂) percent | | | 30− |
| Asphalt content or residue, percent | 55+ | 60+ | 60+ |
| Furol viscosity in seconds: | | | |
| at 25° C | 20–100 | | |
| at 50° C | | 75–400 | 100–1,000 |
| Adhesion test, percent of aggregate coated | 50 to 75 or more. | 50 to 75 or more. | 50 to 75 or more. |

It is difficult to meet all of these specifications. Asphalt content and viscosity are the most readily met, but an emulsion that has satisfactory stability and demulsibility, and also meets the requirements for good adhesion is difficult to make. The invention is concerned with achieving a balance between stability and demulsibility and at the same time improving the adhesion of the asphalt to aggregate. The difficulty of achieving good adhesion along with stability and demulsibility will be readily understood when it is considered that the stability and demulsibility largely involve surface active considerations. The same is true of the adhesion of the asphalt, i. e., the ability of the asphalt to adhere to the aggregate is largely a surface active phenomena. Many compounds are available to improve the adhesion of asphalt cement which cannot be used in asphalt emulsions because these compounds are generally so polar or possess such surface active properties as to interfere with the stability or demulsibility of the emulsion. The selection of an additive which will increase the adhesion and not affect the stability or demulsibility, i. e., will still permit the emulsion to meet specifications on these scores, is a genuine problem in the art not easily solved.

The asphalt emulsions prepared in accordance with the process of this invention contain aluminum sulfate in the asphalt phase. The aqueous phase contains an emulsifier and an excess of a strong base. Such an emulsion meets all the above desiderata.

The aluminum sulfate used in our process may be the ordinary aluminum sulfate $Al_2(SO_4)_3$. However, since an alkaline reaction is desirable, basic aluminum sulfate, $Al(OH)SO_4$, can be used in the process of the invention as well as $Al_2(SO_4)_3$. The basic aluminum sulfate occurs to a varying degree in commercial aluminum sulfates. It is relatively insoluble in water, whereas $Al_2(SO_4)_3$ is soluble, and the solubility of a sample may be taken as an indication of the basic salt content. Any of the various hydrates of $Al_2(SO_4)_3$ may be employed in the process of the invention and the term "aluminum sulfate" is intended to include anhydrous aluminum sulfate, all of the hydrates thereof, and any basic aluminum sulfate present.

The emulsifying agent in the aqueous phase may be any surface active agent or emulsifier. Numerous emulsifiers have been proposed in the asphalt emulsion art and any may be used in accordance with this invention. The emulsifier is not regarded as critical. A soap is more commonly employed, in particular an alkali metal soap of a fatty acid or a rosin acid. Examples are sodium tallate (which is the sodium soap of tall oil); the potassium soap of wood rosin; vegetable or animal oils and fats saponified with alkali; tar oils and resins saponified with alkali; wood tar, wood tar pitch or rosin pitch saponified with alkali; soaps combined with solvents; sulfonated products such as sulfonated derivatives of fatty acids, resins, hydrocarbons and alcohols; sulfonated mineral oil derivatives; and the like.

A small amount of a strong base should be included in the aqueous phase in addition to the emulsifier. The cheapest materials for this purpose are the alkali metal hydroxides, such as sodium hydroxide. In the alternative, however, potassium hydroxide, strong amines, alkylolamines, lithium hydroxide, calcium hydroxide, strontium hydroxide, guanidine, etc., may be employed.

The relative proportions of the ingredients entering into the composition, in general, are not critical. The proportion of the asphalt phase and the aqueous phase are determined largely by specifications which have been described heretofore and viscosity considerations. The amount of aluminum sulfate introduced into the asphalt phase is generally within the range of 0.05 to 2%, preferably about 0.1 to about 0.5%, by weight on a dry basis of the asphalt phase.

The amount of the emulsifier is generally within the range of 0.5 to 5% by weight of the aqueous phase and, as has been explained previously, the amount will depend upon the particular emulsifying agent and stability and demulsibility considerations. The amount of the strong base is generally within the range of 0.01 to 1% by weight, preferably about 0.1 to 0.5% by weight of the aqueous phase. In some cases an amount in excess of 0.2% gives better stability. The amount of and the alkalinity of the base should be sufficient to maintain the pH of the aqueous phase above 7, preferably within the range of 10 to 12.5.

In accordance with this invention, it has been discovered that the aluminum sulfate may be introduced into the asphalt phase as an aqueous solution of aluminum sulfate.

It is not understood exactly what transpires when the aluminum sulfate in the form of an aqueous solution is introduced into the asphalt. Presumably, since the asphalt is generally heated well above the boiling point of water, the water is converted to steam and eliminated in some way and the aluminum sulfate is dispersed in the heated asphalt. This will be the case particularly when the aluminum sulfate solution is introduced on the inlet side of the asphalt pump.

Aluminum sulfate in the dry powdered form is somewhat difficult to handle by conventional transporting and mixing equipment. It is much simpler to prepare a solution of aluminum sulfate, and to add this to the asphalt in a continuous manner and in a measured amount. The invention represents the optimum manner of introducing aluminum sulfate into the asphalt. It was unobvious to us that the aluminum sulfate could be added as a solution to the asphalt and still obtain adequate distribution and intimate mixing of the aluminum sulfate in the asphalt phase by means of the asphalt pump. Thus no additional mixing step or equipment is needed. In addition, it was not obvious to us that water could be introduced into the asphalt without modifying it or rendering it unsuitable for emulsification with the aqueous phase.

In some instances, not all of the aluminum sulfate may be soluble in the water, particularly in the case where the aluminum sulfate is or contains basic aluminum sulfate. Any of the aluminum sulfate that is insoluble in the water may be slurried or suspended in it. Reference herein to an aluminum sulfate solution is intended to include the embodiments in which all of the aluminum sulfate is in solution and embodiments in which a part of the aluminum sulfate is in solution and the balance is suspended or slurried in the water. The concentration of the aluminum sulfate in the solution is not critical and since it is the amount of aluminum sulfate in the asphalt that is important, the rate of feeding the solution can be adjusted in accordance with the concentration. Solutions are preferred to slurries and more concentrated solutions are preferred to weak solutions. If desired, the solution may be heated to facilitate dissolving of the aluminum sulfate and maintaining it in solution.

Reference may be made to the accompanying drawing for a more detailed description of a preferred embodiment of the invention in which the process is illustrated by means of a flow sheet.

In practicing the invention, the asphalt is placed in an asphalt reservoir 1, which is equipped with a heating coil 3. Steam under pressure or other heating medium is passed through the coil 3 to heat the asphalt above its melting point, generally to a temperature within the range of 250 to 300° F. If desired, the asphalt may be preheated by other means and introduced into the reservoir 1 in molten form at about the desired temperature, and the coil 3 may be used merely to maintain the asphalt at this temperature. A solution of an emulsifier together with the excess of the strong base is placed in the reservoir 2. A pump 5 is connected to the reservoir 2 through a conduit and a discharge line 4 from the pump leads to a three-way valve 6. By adjustment of the three-way valve 6 the emulsifier solution may be pumped and recycled to the reservoir or it may be pumped to the colloid mill 7. Connected to the asphalt reservoir 1 by a conduit 13 is an asphalt pump 12. The asphalt pump is of a gear type which has a shear action resulting in intimate mixing of the asphalt within the pump as it is being moved from the conduit 13 and transported through conduits to the colloid mill 7. A pump of the "Viking" type is suitable.

A reservoir 11 is provided for the aluminum sulfate solution which leads by way of a conduit 10 into the pump 12. A valve 9 is included in the conduit 10 to regulate the rate at which the aluminum sulfate solution flows into the asphalt. Or in the alternative, the valve 9 may be replaced by a metering pump which is geared to the pump 12 so that these two pumps control related flow rates. It is generally sufficient, however, to place the aluminum sulfate solution reservoir above the asphalt reservoir and to control the flow by the action of gravity with an appropriate valve. If the aluminum sulfate solution contains undissolved material, this may be kept suspended by means of an agitator in the reservoir 11, or it may be redissolved by heating the solution. The aluminum sulfate solution from the conduit 10 may be introduced into the molten asphalt at any point between the outlet from the asphalt reservoir 1 and the pump 12, such as in the conduit 13. Since the action is essentially one of mixing the aluminum sulfate with the asphalt in the pump 12, it is sufficient that the aluminum sulfate and asphalt be present in the pump in the required amount and the point at which the two meet is immaterial. However since the flashing of the water of the aluminum sulfate solution into steam is believed to facilitate the mixing, it is preferred to introduce the solution directly into the pump. Reference herein to the aluminum sulfate solution being introduced on the inlet side of the pump is meant to include any point in the asphalt flow on the inlet side of the pump, between the pump and the asphalt reservoir.

The asphalt with which the aluminum sulfate has been thoroughly mixed in the pump is then discharged to the colloid mill 7 where the asphalt and the emulsifier solution are emulsified and the asphalt emulsion discharged through the product line 8.

When the process is started up, emulsifier solution is recycled by means of the valve 6 until a uniform flow is established following which valve 6 is turned to feed the solution to the colloid mill. As soon as the emulsifier solution emerges from the product line 8, the asphalt with the aluminum sulfate mixed therewith is pumped by the pump 12 into the colloid mill and the rates of pumping by the pumps 5 and 12 are adjusted to give an emulsion of the desired proportions. After diverting a small amount of the emulsion to waste a sample is collected for analysis. The asphalt emulsion is discharged from the colloid mill at a temperature of about 175° to 185° F. and is allowed to cool slowly to room temperature before testing.

The invention will be further illustrated with reference to the following example: A quantity of asphalt (pipe still bottoms) is placed in the asphalt reservoir 1 and heated to a temperature of 260° F. An aluminum sulfate solution containing about equal parts of hydrated aluminum sulfate ($Al_2(SO_4)_3 \cdot 14H_2O$) and water is placed in the reservoir 11 and heated to a temperature of 160° to 180° F. An aqueous emulsifier solution is prepared containing 4.0% by weight of the potassium salt of wood rosin and 0.5% by weight of sodium hydroxide, based on the total aqueous solution, and placed in the emulsifier solution reservoir 2. The process is then started as described heretofore and the pumps 5 and 12 and the valve 9 are regulated to feed about 52 gallons per minute of asphalt, 0.32 gallon per minute of the aluminum sulfate solution, and about 21.9 gallons per minute of the emulsifier solution. The product has the following properties:

| | |
|---|---|
| Asphalt residue percent | 71.5 |
| Soap based on the aqueous phase do | 4.0 |
| Sodium hydroxide based on the aqueous phase percent | 0.25 |
| Aluminum sulfate based on the asphalt phase (anhydrous) percent | 0.23 |
| Furol viscosity at 77° F. (sec.) | 174.0 |
| Demulsibility (50 cc. N/10 $CaCl_2$) | 0.2 |
| Stability | Good |
| Adhesion (amount coated) percent | 97 |

From the above description it will be seen that the product prepared in accordance with the invention meets all other requirements for a medium setting asphalt emulsion.

In contrast to the above example, if the aluminum sulfate solution is added to the aqueous emulsifier solution, the emulsion is unstable due to the ionic effect of the aluminum sulfate in the aqueous phase and no improvement in adhesion is obtained.

From this comparison of results it will be seen that the addition of the aluminum sulfate to the asphalt phase in the simple and expedient manner of adding it as a solution results in desirable stability and adhesion properties of the final asphalt emulsion.

We claim:

1. A method of producing a stable asphalt emulsion having improved adhesion and other requisite properties, which comprises adding an aqueous solution of aluminum sulfate to asphalt which is maintained at a temperature above the boiling point of water and intimately mixing the aluminum sulfate solution with the asphalt, and then emulsifying the resulting asphalt mixture with an aqueous solution of an emulsifier and an excess of a strong base to form an asphalt emulsion.

2. A method of producing a stable asphalt emulsion having improved adhesion and other requisite properties, which comprises adding an aqueous solution of aluminum sulfate to molten asphalt which is maintained at a temperature above the boiling point of water and intimately mixing the aluminum sulfate solution with the asphalt, and then emulsifying the resulting asphalt mixture with an aqueous solution of an alkali metal tallate and an excess of an alkali metal hydroxide to form an asphalt emulsion.

3. A method of making an asphalt emulsion in which asphalt at a temperature above the boiling point of water sufficient to maintain the asphalt in molten form is pumped with agitation to an emulsifying zone and in which an aqueous alkaline solution of an emulsifier is pumped to said emulsifying zone, the step of introducing into the molten asphalt at the inlet side of the asphalt pump an aqueous solution of aluminum sulfate, whereby the water is flashed off and the aluminum sulfate is intimately mixed with the asphalt before it is emulsified with the aqueous phase.

References Cited in the file of this patent

UNITED STATES PATENTS

| | | |
|---|---|---|
| 1,832,987 | Kirschbraun | Nov. 24, 1931 |
| 2,278,684 | Asbury et al. | Apr. 7, 1942 |
| 2,313,759 | McCoy | Mar. 16, 1943 |
| 2,330,100 | Williams | Sept. 21, 1943 |
| 2,331,022 | Garofalo | Oct. 5, 1943 |
| 2,376,447 | Mullin | May 22, 1945 |
| 2,397,326 | Payne et al. | Mar. 26, 1946 |
| 2,412,545 | Watts | Dec. 10, 1946 |
| 2,509,574 | McCoy | May 30, 1950 |
| 2,597,472 | Gray | May 20, 1952 |
| 2,615,851 | Manzer | Oct. 28, 1952 |